G. W. REED.
Dumping Apparatus.
No. 139,613.  Patented June 3, 1873.
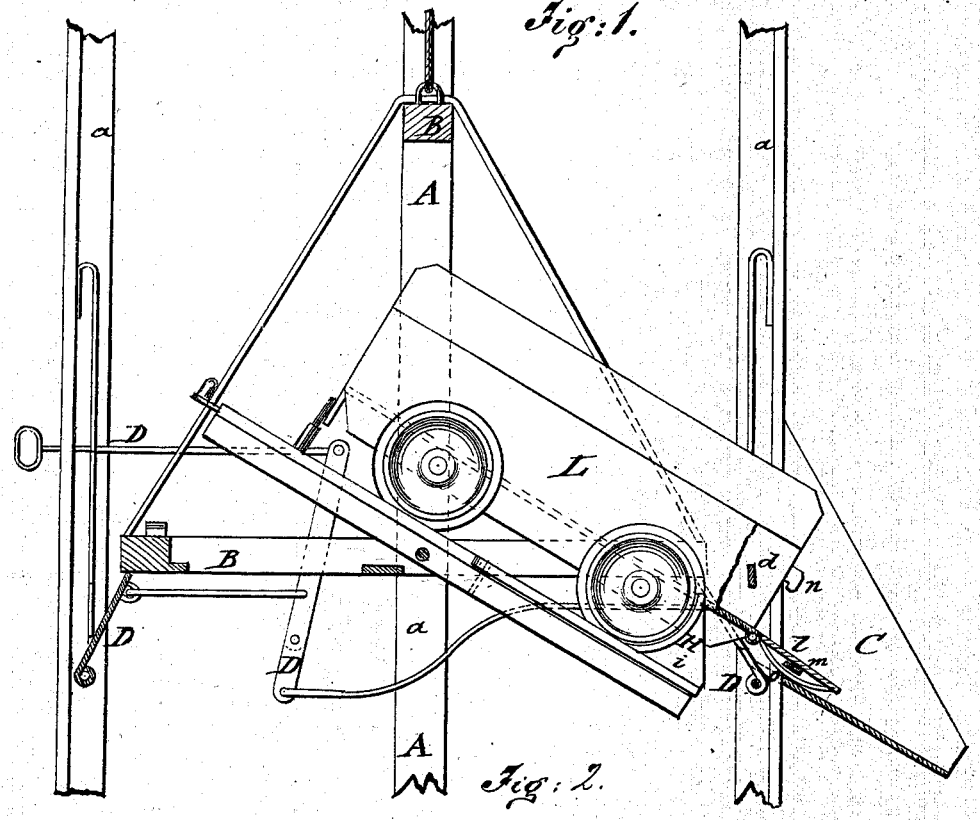
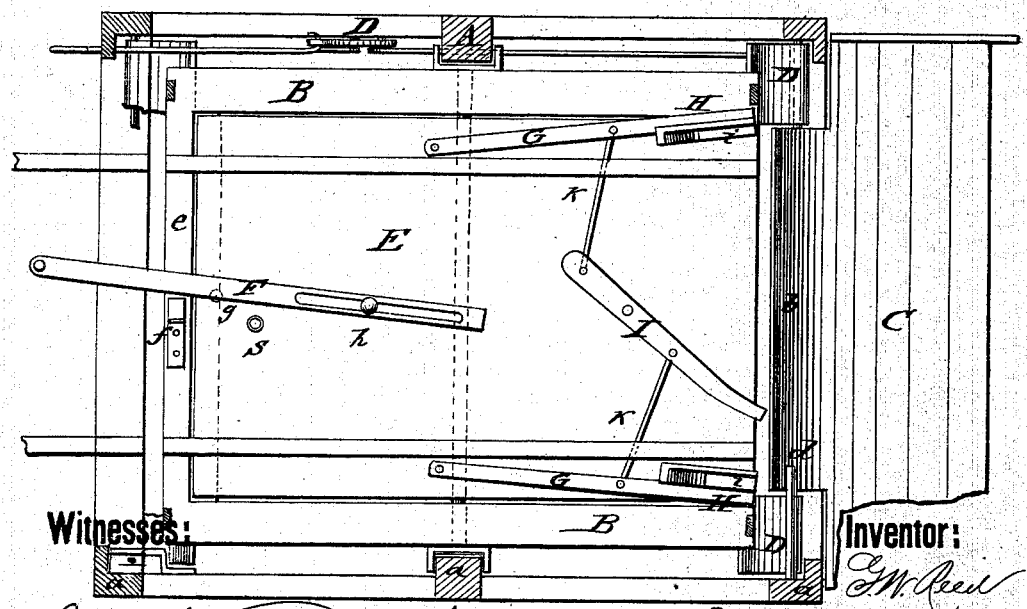

UNITED STATES PATENT OFFICE.

GEORGE W. REED, OF MIDDLESEX, PENNSYLVANIA.

IMPROVEMENT IN DUMPING APPARATUS.

Specification forming part of Letters Patent No. 139,613, dated June 3, 1873; application filed April 19, 1873.

*To all whom it may concern:*

Be it known that I, GEORGE W. REED, of Middlesex, in the county of Mercer and State of Pennsylvania, have invented a new and useful Improvement in Dumping Apparatus, of which the following is a specification:

In the accompanying drawing, Figure 1 represents a side elevation of my improved dumping apparatus, partly in section; and Fig. 2, a plan view of the platform to which the car is attached in dumping.

Similar letters of reference indicate corresponding parts.

The object of my invention is to construct, for the use in collieries, mines, and other purposes, a dumping apparatus by which coal or ore may be conveyed and discharged over the chute by one attendant in a rapid and effective manner. My invention consists, mainly, in a platform pivoted into the hoisting-frame, to which the loaded car is securely locked and dumped, the doors opening and closing by suitable mechanical means.

In the accompanying drawing, A represents the frame, which connects the bottom of the mine with the chute. The platform frame or cage B is hoisted and lowered therein by means of suitable power between vertical guide-rails $a$. The chute C is attached to the side of frame A, and provided with an extension, $b$, of the inclined bottom, which acts on the open door of the car, after discharging the load, so as to lock the same again. By lever and spring arrangement D, cage B is retained securely above the chute C. A horizontal arm, $d$, projects from frame A, above chute C, and acts on the similarly-extending lock-lever of the car-door when dumping, detaching thereby the lever and throwing the door open to discharge the load. E is the platform, pivoted sidewise to cage B. The rails which connect with the different tracks leading to the platform extend over the transverse piece $e$ of the cage, which is also provided with a staple or keeper, $f$, for slide-lever F, securing thereby the rigid locking of the platform to the cage. By placing a pin into hole $g$ of the platform, lever F may be still more secured, especially against accidental displacement when men or animals are hoisted and lowered. Slide-lever F is pivoted to the platform at $h$, and slotted, to be drawn out and used as hand-lever for lifting the platform into an inclined position for dumping. It is pushed back, when the cage is to be lowered, so as not to project beyond piece $e$, and interrupt the descent of the cage. To secure the car on platform E two side rails, G, are pivoted to the platform along the outer side of the track, and provided at their ends with convex car-stops H, placed on strong plates $i$ which project toward the inside of the track. The car-stops H are arcs of a circle, of the same diameter as the car-wheels, fitting thereby closely to them. Rails G and stops H must be constructed of sufficient strength to resist the weight and shocks of the loaded car on dumping. Both side rails G are pivoted by rods K, passing through slots of the track-rails, to lever I, whose fulcrum is placed centrally between rods K, acting thereby equally on both car-stops H, forcing them to the outside to admit cars from both directions, and passing back over the rails to attach to the wheels. A pin placed into socket S, at the opposite end of the platform, locks the car from the other end. The car L may be a common coal-car, with one or two hinged doors, $l$, to the outer side of which the lever $m$ is centrally pivoted. Lever $m$ locks into projecting hooks $n$ of the sides of the car, one being placed downward, the other upward. Lever $m$ is extended beyond the upward hook $n$, and curved backward, opening the door when striking against arm $d$ of frame A. A curved band-piece, O, is applied to the door $l$, which, on the descending motion of the cage, is acted upon by extension $b$ of the chute, and closed without delay.

To operate the apparatus the car is secured to the platform by the stops and pin, and tipped over by the slide-lever opening its door and discharging the load. The platform is then brought back to the cage, secured to it and replaced by another, or lowered to be refilled.

Having thus described my invention, I claim as new and desire to secure by Letters Patent—

1. Slide-lever F, slotted and pivoted to platform E, substantially as set forth.

2. Side rails G having car-stops H, in combination with pivoted lever I and rods $k$, substantially as described.

3. Frame A, having projecting arm $d$ to act on lever $m$ of car-door for opening the same, as set forth.

4. Car L with door $d$, having pivoted lever $m$ and circular piece O, as described.

5. Chute D, having bottom extension $b$ to act on car-door for closing the same, as specified.

GEORGE W. REED.

Witnesses:
R. A. DUNNING,
DAVID FARRELL.